United States Patent [19]
Baczek et al.

[11] 4,256,553
[45] Mar. 17, 1981

[54] RECOVERING COPPER FROM CHALCOPYRITE CONCENTRATE

[75] Inventors: Frank A. Baczek, Sandy; Bruce C. Wojcik, Kearns; Alexander A. Jueschke; Daniel M. Lewis, both of Salt Lake City; Jack C. Otto, Magma; Lawrence L. Tuttle, Sandy, all of Utah

[73] Assignee: Envirotech Corporation, Menlo Park, Calif.

[21] Appl. No.: 114,476

[22] Filed: Jan. 23, 1980

[51] Int. Cl.³ .......................... C25C 1/12; C25C 7/00
[52] U.S. Cl. ................................. 204/106; 204/108; 204/275; 204/277; 75/104; 75/115; 75/117
[58] Field of Search ............... 204/106, 108, 275, 277; 75/117, 104, 115

[56] References Cited

U.S. PATENT DOCUMENTS

| | | | |
|---|---|---|---|
| 4,070,183 | 1/1978 | Parker et al. | 204/108 |
| 4,165,264 | 8/1979 | Satchell | 204/108 |

*Primary Examiner*—R. L. Andrews
*Attorney, Agent, or Firm*—Robert E. Krebs; Thomas S. MacDonald

[57] ABSTRACT

A process and system are provided for recovering copper from chalcopyrite concentrate. The chalcopyrite is ground to a mean particle size of about 1.5–5 microns. The ground chalcopyrite is then divided into a first stream and a second stream. The first stream is leached in a leach solution containing at least about 100 gpl sulfuric acid and about 10–30 gpl ferric iron to produce a copper sulfate solution containing about 40–75 gpl dissolved copper and less than about 5 gpl ferric iron. The second stream of ground chalcopyrite is combined with the copper sulfate solution and with sulfur dioxide such that the combination reacts to precipitate dissolved copper from the copper sulfate solution as simple copper sulfides and to produce a liquor containing dissolved ferrous iron. The simple copper sulfides are then separated from the ferrous iron liquor. Sulfuric acid is added to the ferrous iron liquor to precipitate the ferrous iron as ferrous sulfate and the produce a recycle solution containing about 400–600 gpl sulfuric acid. The recycle solution is added to the leach solution. Copper is recovered from the simple copper sulfides.

26 Claims, 5 Drawing Figures

RECOVERING COPPER FROM CHALCOPYRITE CONCENTRATE

BACKGROUND OF THE INVENTION

1. Field of the Invention

The present invention relates to recovering copper from a copper-bearing ore and more particularly to a hydrometallurgical process and system for recovering copper from chalcopyrite concentrate.

2. State of the Art

Because of increasingly stringent environmental controls, alternatives are being sought for the conventional methods for producing commercial grade copper. Many of the new methods under investigation are hydrometallurgical. That is, copper from a copper-bearing mineral is first dissolved into solution and then recovered from the solution. Typically, the copper is recovered by electrolytic techniques.

Chalcopyrite ($CuFeS_2$) is the primary copper-bearing mineral mined in the world. In the past, the efficient hydrometallurgical recovery of copper from chalcopyrite has been hampered by two major obstacles. First, chalcopyrite concentrate is extremely difficult to leach. That is, it is extremely difficult to dissolve copper from the chalcopyrite concentrate into solution. Second, known chalcopyrite leaching techniques which are successful in efficiently leaching copper into solution also leach iron from the chalcopyrite into solution. Because excessive iron in solution interferes with the electrolytic recovery of copper, a separation of the dissolved copper and the dissolved iron must be accomplished before the copper may be recovered from the solution. For these reasons, and because of increasing environmental demands, a great deal of research has been conducted, both by academic and commercial interests, toward the efficient recovery of copper from chalcopyrite by hydrometallurgical techniques.

A number of investigations have been directed to hydrometallurgical techniques which involve the direct leaching of chalcopyrite in an electrolytic cell with the concomitant recovery of pure copper. Processing of the chalcopyrite in this manner results in the problem stated above, namely, iron dissolved from the chalcopyrite accumulates within the electrolyte contained in the recovery cell. Thus, complicated and expensive purification systems are required to remove iron from the electrolyte. The simultaneous leaching and electrowinning of copper from chalcopyrite in an electrolytic cell suffers from the additional basic problem that the cell generates only 50% of the oxidant required to leach copper from the chalcopyrite at the same rate at which it is being electrowon. The remaining 50% of the required oxidant must be supplied from an external source.

To avoid iron build-up in the electrolytic cell, methods have been developed for removing iron from the chalcopyrite processing circuit prior to introduction of the copper solids to the cell. According to one such method, a stoichiometric amount or more of sulphuric acid is utilized to dissolve both the iron and the copper contained in the chalcopyrite concentrate at high temperature and under high oxygen pressure. The copper-iron solution thus produced is then oxidized under autoclave conditions to precipitate the dissolved iron. The resulting copper solution is then processed in an electrolytic cell. According to a second well-known approach, the chalcopyrite concentrate is roasted prior to leaching to make the copper soluble and the iron insoluble.

Both of the above methods have serious associated problems which prevent them from becoming competitive with conventional methods for producing copper. The use of high temperature and high pressure autoclaves is expensive both in capital costs and in operation. In addition, autoclaves cause the oxidation of at least some of the sulfur contained in the chalcopyrite to sulfate, an undesirable end product which must be removed from the system. If roasting is used, the most of the pollution problems encountered by conventional methods are introduced and it becomes expensive and difficult to operate within government standards.

According to another approach to chalcopyrite processing, chalcopyrite leaching without the use of autoclave conditions is accomplished by initially fine grinding the chalcopyrite concentrate to a particle size of one micron or less. The finely ground chalcopyrite concentrate is then leached in a low acidity, ferric sulfate solution to produce a pregnant leach liquor containing cupric and ferrous ions and solid elemental sulfur. The pregnant leach liquor is then separated from the remaining solids including elemental sulfur and unreacted chalcopyrite concentrate. Copper is then recovered from the pregnant leach solution by one of two alternative methods. According to one method, the pregnant leach solution is treated for iron removal by precipitating ferrous sulfate. The copper-containing solution is then electrolized in a diaphragm cell to produce elemental copper. According to the second method, the pregnant leach solution is subjected to a conventional solvent extraction process to isolate the copper ions which are then reduced to elemental copper by electrolysis. The remaining solution, which contains ferrous iron as dissolved ferrous sulfate, is then treated with sulfuric acid and oxygen to oxidize the ferrous iron to ferric. The ferric iron is then recycled to the leach step for use in treating further amounts of ground chalopyrite concentrate. Such a process is taught by U.S. Pat. No. 4,115,221.

The process taught by U.S. Pat. No. 4,115,221 suffers from a number of disadvantages. To achieve an acceptable leach, the process requires that the chalocopyrite concentrate be ground to a maximum particle size diameter of one micron. Grinding to such a particle size requires a relatively large power input. For example, about four times the power is required to grind the concentrate to a one micron size than is required to grind it to the five micron size typically used in chalcopyrite processing. Another disadvantage of the process is that ferric iron for use in the leach is generated in a clarified solution with no chalcopyrite present. The maximum amount of ferric iron that can be retained in such a solution is about 60 grams per liter. This results in the leaching of only about 15 grams per liter of copper from the chalcopyrite into solution. This means that either dilute copper streams are produced or repeated cycling of the solution through oxidation and leach steps is required to increase the copper concentrations to a level suitable for efficient recovery. Furthermore, if ferrous sulfate is crystallized from a solution containing significant amount of copper, copper is crystallized with the iron. This results in a loss of copper with the iron or requires further processing steps to recover the copper.

According to another chalcopyrite leaching process, chalcopyrite is initially leached with a copper sulfate solution to form a slurry containing the insoluble copper sulfide, digenite, together with soluble iron sulfate and sulfuric acid. The digenite is separated from the iron sulfate solution and treated to produce elemental copper and sulfur. Alternatively, the products of the initial leach are subjected to a secondary leach in which the digenite is converted to a copper sulfate solution while iron sulfate is precipitated as jarosite. The copper sulfate solution is then separated from the remaining solids and elemental copper is recovered from the solution by electrolysis. The processing of the digenite by electrolysis requires only one-half of the oxidant per unit of copper leached as does processing the chalcopyrite concentrate. This means that an electrolytic cell supplies all of the required oxidant for the simultaneous leaching and electrowinning of the digenite. This process is taught by U.S. Pat. No. 3,957,602.

However, the process taught by U.S. Pat. No. 3,957,602 also suffers from a number of disadvantages. The conversion of chalcopyrite to digenite is carried on at temperatures greater than 100° C. and preferably at temperatures of 180°–200° C. This requires the utilization of expensive autoclaving equipment. The process also generates significant amounts of excess free acid.

SUMMARY OF THE INVENTION

According to the present invention, ground chalcopyrite concentrate is converted to simple copper sulfides, with the concomitant removal of iron, prior to recovery of pure copper. Chalcopyrite concentrate is first ground to a mean particle size diameter of about 1.5–5 microns. The ground concentrate is then divided into two streams.

A first stream of ground concentrate is directed to a leach circuit wherein it is leached in a leach solution containing at least 100 gpl sulfuric acid and about 10–30 gpl ferric iron. The leach circuit produces a pregnant solution containing about 40–75 gpl dissolved copper, less than 5 gpl ferric iron, and at least 100 gpl sulfuric acid. The pregnant solution from the leach circuit is combined in a conversion circuit with the second stream of ground concentrate and with sulfur dioxide. The combination reacts to form simple copper sulfides and a solution containing dissolved ferrous iron. The simple copper sulfides are then separated from the ferrous iron solution. Sulfuric acid is introduced to the ferrous iron solution to precipitate ferrous iron as ferrous sulfate and to produce a recycle solution containing about 400–600 gpl sulfuric acid. The recycle solution is returned to the leach circuit. The simple copper sulfides are directed to a recovery circuit for recovery of copper.

The entire recovery process is carried out at ambient pressures and at temperatures below the boiling point. The process is operated at acidities greater than 100 gpl sulfuric acid and at relatively high slurry densities. By controlling the molar ratio of copper sulfate to chalcopyrite in the conversion circuit at approximately 1.0–1.3 to 1.0, chalcopyrite is converted to primarily covellite with very little acid production and at relatively fast reaction rates. Sulfur dioxide is used in the process as both a catalyst and as a reactant. While prior art processes leach about 90%, the process of the present invention leaches about 98% of the copper from the chalcopyrite concentrate.

DESCRIPTION OF THE PREFERRED EMBODIMENT

Figure 1:
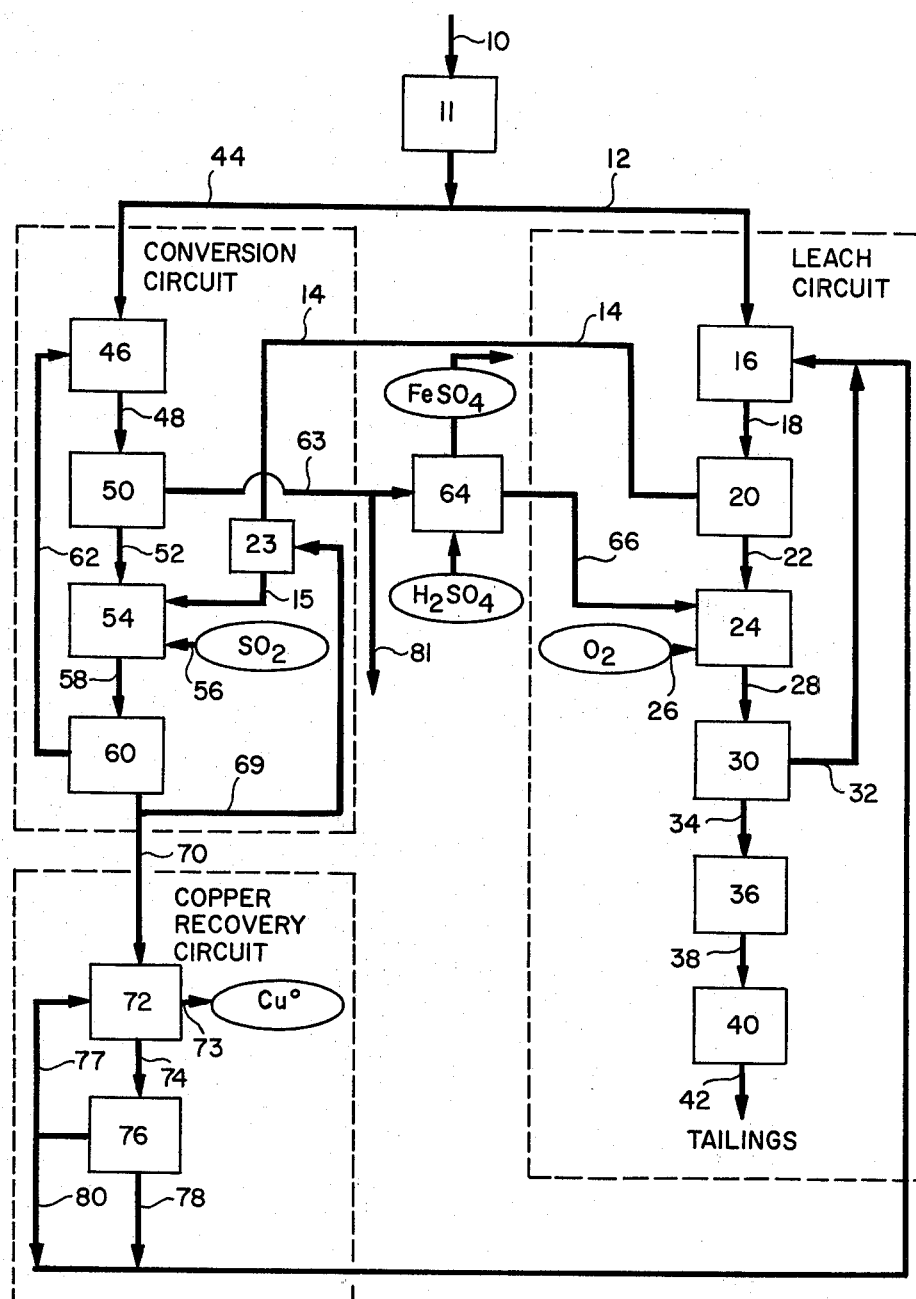
FIG. 1 illustrates a flow sheet of the process of the present invention.

Referring to FIG. 1, chalcopyrite concentrate is introduced via line 10 to a grinding mill 11, preferably a stirred ball mill, wherein it is ground to a mean particle size diameter of about 1.5–5 microns, preferably about 2 microns. The particle size of the ground concentrate influences both reaction rates and completion of reaction in subsequent steps of the process. That is, the smaller the particle size, the faster and more complete the reactions.

The ground chalcopyrite concentrate from the grinding mill 11 is split into two streams. A first stream, preferably about 50% of the ground concentrate, is directed via line 12 to a leach circuit wherein it is leached with ferric iron in a sulfuric acid solution containing at least 100 gpl sulfuric acid to produce a solution containing dissolved copper as copper sulfate. The copper sulfate solution is separated from the remaining solids and directed via line 14 to the chalcopyrite conversion circuit described below.

A preferred leach circuit is shown in detail in FIG. 1. The ground chalcopyrite concentrate directed to the leach circuit via line 12 is combined in a first stage leach reactor 16 with bleed electrolyte and tailings recycled from a copper recovery circuit described below via line 78. In the first stage leach reactor 16, the chalcopyrite concentrate reacts to form cupric ion as dissolved copper sulfate, ferrous iron and elemental sulfur according to the reaction shown in Equation 1.

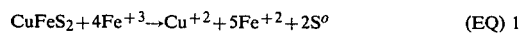

$$CuFeS_2 + 4Fe^{+3} \rightarrow Cu^{+2} + 5Fe^{+2} + 2S^o \qquad (EQ)\ 1$$

The slurry from the first stage leach reactor 16 is directed via line 18 to a separator 20 wherein it is subjected to conventional liquid-solids separation, such as thickening. The copper sulfate solution from the separator 20 is directed to the chalcopyrite conversion circuit via line 14. The remaining solids, including elemental sulfur and unreacted ground chalcopyrite concentrate, are directed via line 22 to a second stage leach reactor 24.

Most of the leach occurs in the second stage leach reactor 24 which contains a solution having about 100–400 gpl, preferably about 150–300 gpl, more preferably about 200–250 gpl, of sulfuric acid.

Oxygen is introduced to the second stage leach reactor 24 via line 26 at temperatures below 100° C. The oxygen reacts with ferrous iron according to the reaction shown in Equation 2 to produce ferric iron. The oxygen is introduced at a rate slightly greater than that at which it is consumed so that a slightly positive oxygen atmosphere, about 0.5–2.0 psi, is present to ensure an available supply to the reaction. The oxygen requirement is about 0.50–0.55 lbs. per pound of copper leached. The oxygen may also react directly with the chalcopyrite contained in the reactor 24 according to the reaction shown in Equation 3. However, this is not a major reaction.

$$4Fe^{+2} + O_2 + 4H^+ \rightarrow 4Fe^{+3} + 2H_2O \quad \text{(EQ 2)}$$

$$CuFeS_2 + O_2 + 4H^+ \rightarrow Cu^{+2} + Fe^{+2} + 2S^\circ + 2H_2O \quad \text{(EQ 3)}$$

The ferric iron thus generated reacts with chalcopyrite concentrate according to the reaction shown in Equation 1.

Figure 2:
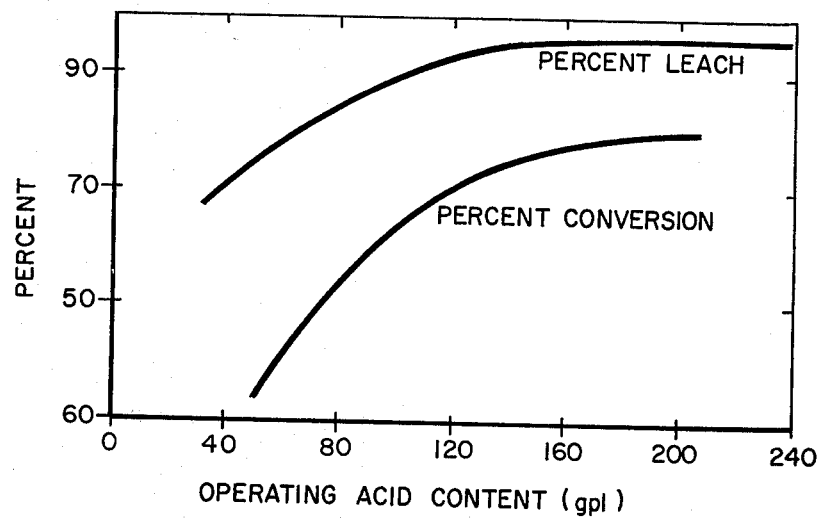
FIG. 2 shows a graph illustrating the relationship between percent leach of copper from chalcopyrite concentrate and percent conversion of chalcopyrite to simple copper sulfides versus sulfuric acid concentration in solution with other parameters being constant.

The slurry from the second stage leach reactor 24 is directed via line 28 to a liquid-solids separation device 30 which separates the solution, containing ferric iron and copper sulfate, from the remaining solids. The solution is then recycled via line 32 to the first stage leach reactor 16 for reaction with further chalcopyrite concentrate. The recycled solution contains about 50–70 gpl iron primarily as ferrous sulfate with about 10–30 gpl of the iron as ferric. The copper concentration of the recycled solution is about 45–65 gpl. The sulfuric acid concentration of the recycled solution is about 150–250 gpl, preferably about 200 gpl. FIG. 2 illustrates the relationship between percent leach of copper from chalcopyrite versus sulfuric acid concentration in solution.

Figure 3:
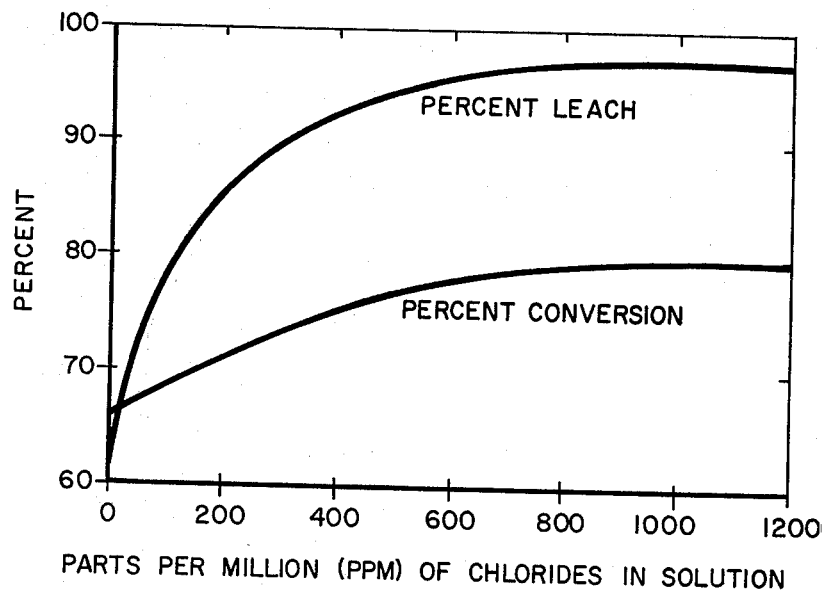
FIG. 3 shows a graph illustrating the relationship between percent leach of copper from chalcopyrite concentrate and percent conversion of chalcopyrite to simple copper sulfides versus chloride content in solution with other parameters being constant.
Figure 4:
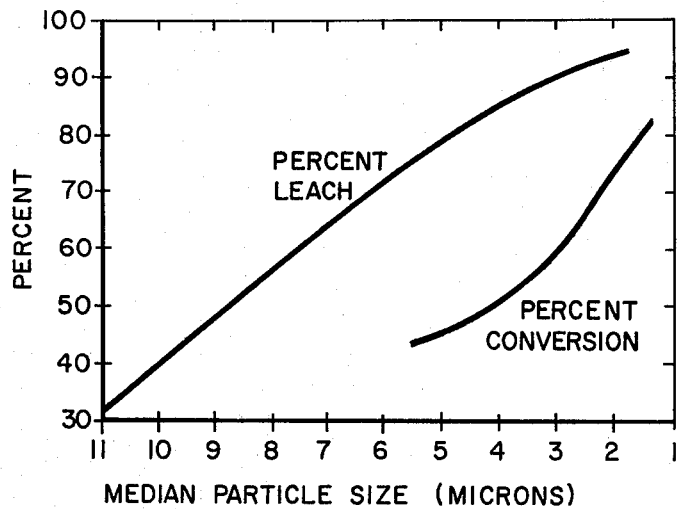
FIG. 4 shows a graph illustrating the relationship between percent leach of copper from chalcopyrite concentrate and percent conversion of chalcopyrite to simple copper sulfides versus the median particle size of the chalcopyrite.

Chlorides are added to the leach circuit to maintain a concentration of about 200–2000 ppm, preferably about 200–1000 ppm. As shown in FIG. 3, the addition of chlorides up to about 1000 ppm is increasingly beneficial to the leach of chalcopyrite. Amounts above 1000 ppm, while not significantly more beneficial, are not detrimental.

The solids from the liquid-solids seperation device 30 are first directed via line 34 to a sulfur recovery unit 36 for the removal of elemental sulfur by conventional methods. The solids from the sulfur recovery unit 36 are then directed via line 38 to a by-product recovery unit 40 for the recovery of precious metals such as gold and silver. The tailings from the by-product recovery unit 40 are directed to disposal via line 42.

Prior art chalcopyrite leaching processes teach that increasing acidity in the leach solution is beneficial up to about 25 gpl sulfuric acid but has no benefit and, in some cases, may be detrimental to the leach in amounts exceeding 25–50 gpl. In the leach circuit of the subject process, as shown in FIG. 2, there is a beneficial relationship between leach rates and acid concentration at high acidities, i.e. sulfuric acid concentrations greater than about 100 gpl.

The leach circuit of the subject process consistently achieves a 96–98% copper leach from finely ground chalcopyrite concentrate. The total retention time in the leach reactors is about 3–5 hours. The temperature is below 100° C., preferably about 85°–90° C. Pressure is ambient. Because the leach reaction of Equation 1 is exothermic, no heating is required except during start-up.

While the leach described above may be carried out in a single stage, it is preferably carried out countercurrently in two stages as shown in FIG. 1. A two-stage countercurrent leach allows complete consumption of ferric iron prior to directing the resulting copper sulfate solution to the conversion circuit. A countercurrent leach also allows conditions in the second stage to be controlled both for "in situ" ferric iron generation utilizing oxygen and for maximum leach rates.

As stated above, the copper sulfate solution generated in the leach circuit is directed via line 14 to the conversion circuit and reacted with a second stream, preferably about 50%, of finely ground chalcopyrite concentrate from the grinding mill 11 and with sulfur dioxide to produce a slurry containing insoluble copper sulfides, primarily covellite, and dissolved ferrous iron. The overall conversion reaction taking place in the conversion circuit is shown in Equation 4.

$$CuFeS_2 + Cu^{2+} \rightarrow 2CuS + Fe^{2+} \quad \text{(EQ 4)}$$

While the conversion reaction may be carried out in a single stage, it is preferably carried out countercurrently in two conversion reactors as shown in FIG. 1. The countercurrent flow of the chalcopyrite concentrate to the copper sulfate solution through the two reactors ensures at least 99% precipitation of copper from solution as copper sulfide.

Referring to FIG. 1, the second stream of ground chalcopyrite concentrate from the grinding mill 11 is directed to a first stage conversion reactor 46 via line 44. The first stage conversion reactor 46 contains partially spent copper sulfate solution. The dissolved copper concentration in reactor 46 is about 5–15 gpl. The slurry resulting from the reaction which takes place in reactor 46, containing partially reacted chalcopyrite concentrate, copper sulfides, primarily covellite, and ferrous iron in solution, is directed via line 48 to a separator 50. Following liquid-solids separation according to conventional techniques, the solids are directed via line 52 to a second stage conversion reactor 54.

In addition to receiving solids from the separator 50, the second stage conversion reactor 54 also receives, via line 14, the copper sulfate solution generated in the leach circuit. The copper concentration of this copper sulfate solution is about 40–75 gpl, preferably about 50–70 gpl. The iron concentration is about 60–90 gpl as ferrous sulfate. The ferric iron concentration of the solution should be less than about 5 gpl, preferably less than about 0.5 gpl. It is most preferred that the solution be substantially free of ferric iron. The presence of ferric iron in any significant amount (greater than about 5 gpl) in the solution will retard the reaction rate in the conversion circuit and can double the time required for the conversion to go to completion. The sulfuric acid concentration of the solution is a minimum of 100 gpl, preferably about 100–300 gpl, more preferably about 150–200 gpl, most preferably about 150–175 gpl. FIG. 2 illustrates the relationship between percent conversion of chalcopyrite to simple copper sulfides and sulfuric acid concentration in solution.

The sulfur dioxide required for the conversion reaction is introduced to the second stage conversion reactor 54 via line 56. The sulfur dioxide is not consumed in very large quantities, its primary purpose being to establish and maintain a low EMF or oxidation potential in the slurry. The sulfur dioxide is added in an amount sufficient to maintain a slight pressure, about 0.5–2.0 psi, of SO₂ to ensure an adequate supply as needed. Less than about 0.3 lbs. SO₂ is required per pound of copper in the solution introduced to the conversion circuit.

Figure 5:
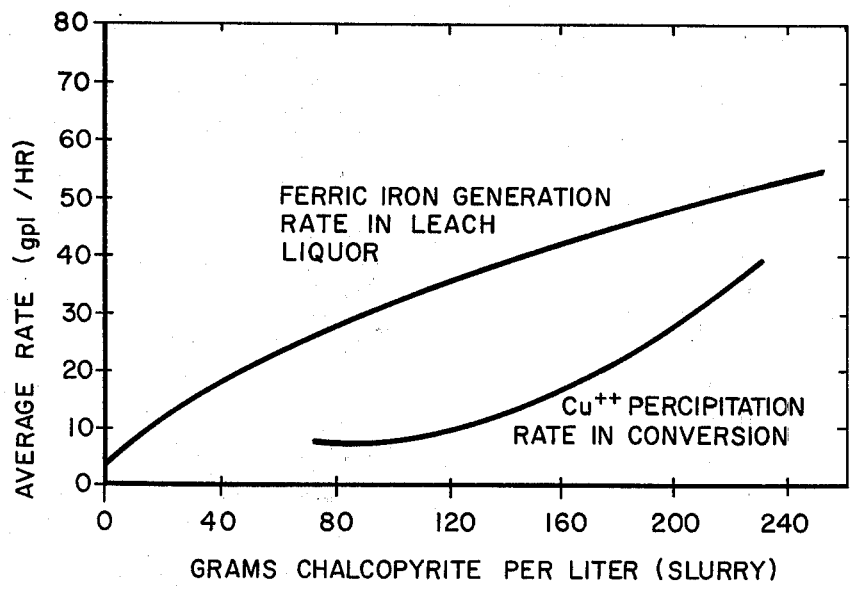
FIG. 5 shows a graph illustrating the effect of slurry density both on ferric iron generation in the leach circuit and on cupric ion precipitation rate in the conversion circuit.

The potential decrease in reaction rates due to the high acid concentrations utilized in the conversion circuit is offset by increasing the slurry density in the circuit. The molar ratio of copper sulfate to chalcopyrite is maintained at about 1.0–1.3 to 1.0. FIG. 5 illustrates the effect of slurry density on cupric ion precipitation. The limitation to increasing the slurry density is the solubility limits of copper and iron in the solution received from the leach circuit via line 14. As stated, this solution contains about 40–75 gpl copper. The ferrous ion concentration is about 65 gpl. The chloride concentration is about 200–1000 ppm.

It has been found that the presence of ferric iron in the copper sulfate solution dictates the sequential mixing of the solution, the chalcopyrite concentrate and the sulfur dioxide in the reactor 54. It is very important to ensure that substantially all of the ferric iron has been reduced to ferrous before the sulfur dioxide is added, the rate of the reaction shown in Equation 4 being dependent upon the EMF or oxidation potential due to ferric iron in solution at the time the sulfur dioxide additions are started. If there is a significant amount (0.5 gpl or more) of ferric iron in the solution at the time that the SO₂ additions are started, then the oxidation potential of the slurry will remain proportionately higher throughout the reaction in comparison with the oxidation potential of a solution containing very little or no ferric iron at the time of sulfur dioxide introduction. This means that the conversion reaction takes longer to go to completion. If large amounts of ferric iron are present in the solution at the time that sulfur dioxide additions begin, the conversion reaction may never start.

Thus, as shown in FIG. 1 the copper sulfate solution leaving the separator 20 via line 14 is combined in a pre-mix vessel 33 with product copper sulfides introduced via line 69. The retention time in the pre-mix vessel 23 is about 15–60 minutes. The solution leaving the pre-mix vessel via line 15 for introduction to the reactor 54 contains less than about 3 gpl ferric iron and preferably less than about 1 gpl at the time that sulfur dioxide additions to reactor 54 begin. The EMF measurements for the solution entering reactor 54 will vary because the EMF value is a measure of the ferric/ferrous ratio but will preferably be below 360 MV relative to a platinum electrode with a calomel reference.

The slurry from the second stage conversion reactor 54 is directed via line 58 to a separator 60 wherein the copper sulfides and any unreacted chalcopyrite are separated from the conversion solution. The conversion solution, containing partially spent copper sulfates is recycled via line 62 to the first stage conversion reactor 46 to react with ground chalcopyrite concentrate from the grinding mill 11. This solution also contains any excess unreacted sulfur dioxide from the second stage conversion reactor 54.

By controlling the grind size and slurry density in the conversion circuit and the initial composition of the copper sulfate solution, the formation of covellite according to the reaction of Equation 4 is predominant. The formation of chalcocite according to the reaction shown in Equation 5 becomes prevalent as chalcopyrite is consumed in the conversion reaction.

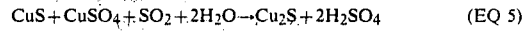

$$CuS + CuSO_4 + SO_2 + 2H_2O \rightarrow Cu_2S + 2H_2SO_4 \quad (EQ\ 5)$$

Thus, it is preferred that the operating parameters in the conversion circuit allow for conversion of only about 80% of the ground chalcopyrite concentrate fed into the circuit. In this way, as stated above, an end product consisting primarily of covellite is obtained with a copper requirement of about 1–1.3 moles in solution per mole of chalcopyrite converted. These results are twice as good as the results obtained by the reaction shown in Equation 6 wherein two moles of dissolved copper in the conversion solution are required for each mole of chalcopyrite converted to chalcocite.

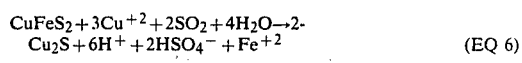

$$CuFeS_2 + 3Cu^{+2} + 2SO_2 + 4H_2O \rightarrow 2Cu_2S + 6H^+ + 2HSO_4^- + Fe^{+2} \quad (EQ\ 6)$$

As stated above, the effluent solids from the conversion reactors are composed primarily of covellite with some digenite, chalcocite, chalcopyrite, pyrite and gangue. Solids assay 48%–53% copper with 7%–10% iron. Only 10%–12% of contained copper content is as chalcopyrite. Impurities such as zinc and nickel are leached out in the conversion circuit while the precious metals and molybdenum remain with the solids.

Referring again to FIG. 1, following conventional liquids-solids separation in separator 50, the effluent liquor from the first stage conversion reactor 46, which liquor contains ferrous iron dissolved from the chalcopyrite, is directed via line 63 to an acid addition step 64 for the addition of make up acid via line 67. A portion of the effluent liquor is removed from line 63 is removed via line 81 to remove excess water and impurities from the process. Sufficient acid is added to crystallize most of the ferrous iron as solid ferrous sulfate. The solution entering the acid addition step contains less than 0.1 gpl copper, about 95–105 gpl ferrous iron, about 175–275 gpl sulfuric acid and small amounts of zinc, nickel and other trace elements. During the precipitation of ferrous sulfate, most of the trace elements except for nickel, cobalt and chromium, are removed along with approximately 80–90% of the iron. The crystallized ferrous sulfate is then removed from the solution via line 68 and directed to disposal wherein it may be redissolved in water and oxidized to form jarosites or hemitites. If further iron removal is required evaporation may be used. The resulting high acidity solution is directed to the leach circuit via line 66 for reuse. The acid concentration of this solution is at least about 400–600 gpl sulfuric acid.

After a thorough washing in the separator 60, the copper sulfides produced in the conversion circuit are fed via line 70 into a copper recovery circuit for the recovery of pure copper in an electrowinning cell 72. U.S. Pat. No. 4,066,520 discloses an example of an electrolytic recovery technique which can be used in the process of the subject invention for recovering copper. The technique is described in detail beginning at line 21 of column 5 and ending at line 15 of column 7 of the patent, which description is specifically incorporated by reference herein.

In general, in the cell 72, the copper sulfide solids are agitated in the presence of a sulfuric acid, copper sulfate, ferrous sulfate electrolyte. A concentration of soluble iron in the range of about 10–40 gpl is kept in solution in the electrolyte at all times. By continuously passing a direct current through the electrolyte between the cathodes and anodes contained in the cell, commercial grade copper is deposited on the cathode without the liberation of oxygen at the anode. The current density is maintained in excess of about 60 amperes per square foot of cathode area. Periodically, the cathodes are removed from the cell 72 and pure copper is removed therefrom, as shown at 73 in FIG. 1.

Referring again to FIG. 1, the slurry from the cell 72 is directed via line 74 to a separator 76 wherein the electrolyte is recoverd and recycled to the cell via line 77. The tailings from the separator 76 are returned to the leach circuit via line 78. This is done to leach the last 15% to 20% of the copper from the chalcopyrite concentrate which has been allowed to pass through the conversion circuit. After the tailings exit the leach circuit, an overall 97%-98% leach of copper values has been obtained. Bleed electrolyte from line 80 is also recycled to the leach circuit via line 78.

Typically a four hour retention time in the cell 72 is sufficient for a 80%-90% leach of the contained copper. At 85% leach of the copper values, less than 0.05 grams iron is leached into solution per gram of copper leached. At this iron build-up rate (0.2 gpl/hr), only 15% of the electrolyte need to be bled in a 24 hour period to maintain a 30 gpl iron content in the solution. As long as there is no problem with contamination build-up from other metals, the copper extraction can be reduced to 80% in the cell so that the iron contamination and required bleed of electrolyte can be reduced to 0.02 grams of iron leached per gram of copper leached, requiring only a 6% bleed of electrolyte per day.

We claim:

1. A process for recovering copper from chalcopyrite concentrate comprising:
   a. grinding said chalcopyrite concentrate to a mean particle size diameter of about 1.5–5 microns;
   b. dividing said ground chalcopyrite concentrate into a first stream and a second stream;
   c. leaching said first stream in a leach solution containing at least about 100 gpl sulfuric acid and about 10–30 gpl ferric iron to produce a copper sulfate solution containing about 40–75 gpl dissolved copper and less than about 5 gpl ferric iron;
   d. combining said second stream with said copper sulfate solution and with sulfur dioxide such that said combination reacts to precipitate said dissolved copper from said solution as simple copper sulfides and to produce a liquor containing dissolved ferrous iron;
   e. separating said simple copper sulfides from said ferrous iron liquor;
   f. adding sulfuric acid to said ferrous iron liquor to precipitate said ferrous iron as ferrous sulfate and to produce a recycle solution containing about 400–600 gpl sulfuric acid;
   g. adding said recycle solution to said leach solution of step (c) above; and
   h. recovering copper from said simple copper sulfides.

2. The process of claim 1 wherein said first stream comprises about 50% of said ground chalcopyrite concentrate.

3. The process of claim 1 wherein said leach solution contains about 200–250 gpl sulfuric acid.

4. The process of claim 1 wherein said leach solution contains about 200–2000 ppm chloride.

5. A process according to claim 1 further including introducing oxygen to said leach solution for the in situ oxidation of ferrous iron contained in said leach solution to ferric iron.

6. The process of claim 5 wherein said oxygen is introduced at a temperature below about 100° C.

7. The process of claim 5 wherein said oxygen is introduced at ambient pressure.

8. The process of claim 1 wherein said copper sulfate solution contains about 60–80 gpl iron as ferrous sulfate.

9. The process of claim 1 wherein said copper sulfate solution contains about 150–175 gpl sulfuric acid.

10. The process of claim 1 wherein the weight ratio of sulfur dioxide introduced to said copper sulfate solution to dissolved copper in said copper sulfate solution is about 0.3 or less.

11. The process of claim 1 wherein the molar ratio of copper sulfate in said copper sulfate solution to chalcopyrite in said second stream is maintained at about 1.0–1.3 to 1.0.

12. The process of claim 1 wherein said copper is recovered from said simple copper sulfides by electrolysis.

13. The process of claim 1 wherein, prior to combining said copper sulfate solution with sulfur dioxide, said copper sulfate solution is premixed with precipitation product such that ferric iron contained in said copper sulfate solution is reduced to ferrous iron such that the ferric iron concentration of said copper sulfate solution is less than about 3 gpl.

14. The process of claim 13 wherein said copper sulfate solution and said precipitation products are premixed to ensure that the ferric iron concentration of said copper sulfate solution is less than about 1 gpl.

15. A system for recovering copper from chalcopyrite concentrate comprising:
   a. grinding means for reducing the chalcopyrite concentrate to a mean particle size diameter of about 1.5–5 microns;
   b. a leaching circuit for leaching a first portion of said ground chalcopyrite in a leach solution containing at least about 100 gpl sulfuric acid and about 10–30 gpl ferric iron to produce a copper sulfate solution containing about 40–75 gpl dissolved copper amd less than about 5 gpl ferric iron;
   c. a conversion circuit wherein said copper sulfate solution is combined with a second portion of said ground chalcopyrite concentrate and with sulfur dioxide such that said combination reacts to precipitate said dissolved copper from said solution as simple copper sulfides and to produce a liquor containing dissolved ferrous iron;
   d. separation means for separating said simple copper sulfides from said ferrous iron liquor;
   e. acid additional means for adding sulfuric acid to said ferrous iron solution to precipitate said ferrous iron as ferrous sulfate and to produce a recycle solution containing about 400–600 gpl sulfuric acid;
   f. recycle means for returning said recycle solution to said leach circuit; and
   g. a copper recovery circuit for recovering copper from said simple copper sulfides.

16. The system of claim 15 wherein said first portion comprises about 50% of said ground chalcopyrite concentrate.

17. The system of claim 15 wherein said leach solution contains about 200–250 gpl sulfuric acid.

18. The system of claim 15 wherein said leach solution contains about 200-2000 ppm chloride.

19. A system according to claim 15 further including means for introducing oxygen to said leach circuit for the in situ oxidation of ferrous iron contained in said leach solution to ferric iron.

20. The system of claim 19 wherein said oxygen is introduced at a temperature below 100° C.

21. The system of claim 19 wherein said oxygen is introduced at ambient pressure.

22. The system of claim 15 wherein said copper sulfate solution contains about 60-80 gpl iron as ferrous sulfate.

23. The system of claim 15 wherein said copper sulfate solution contains about 150-175 gpl sulfuric acid.

24. The system of claim 15 wherein the weight ratio of sulfur dioxide introduced to said copper sulfate solution to dissolved copper in said copper sulfate solution is about 0.3 or less.

25. The system of claim 15 wherein the molar ratio of copper sulfate in said copper sulfate solution to chalcopyrite in said second portion is maintained at about 1.0-1.3 to 1.0.

26. The system of claim 15 wherein said copper recovery means is electrolytic.

* * * * *